United States Patent
Vishlitzky

(10) Patent No.: US 7,869,768 B1
(45) Date of Patent: Jan. 11, 2011

(54) TECHNIQUES FOR CONTROLLING SPEAKER VOLUME OF A PORTABLE COMMUNICATIONS DEVICE

(76) Inventor: Natan Vishlitzky, 87 Clinton Rd., Brookline, MA (US) 02445

( * ) Notice: Subject to any disclaimer, the term of this patent is extended or adjusted under 35 U.S.C. 154(b) by 778 days.

(21) Appl. No.: 11/502,024

(22) Filed: Aug. 10, 2006

(51) Int. Cl.
*H04B 7/00* (2006.01)

(52) U.S. Cl. .............. 455/67.13; 455/501; 455/63.1; 455/414.1; 379/387.01; 379/392.01; 379/418; 379/420.01

(58) Field of Classification Search .............. 455/414.1, 455/67.13, 218, 232.1, 501, 63.1; 379/387.01, 379/392.01, 418, 420.1
See application file for complete search history.

(56) References Cited

U.S. PATENT DOCUMENTS

| | | | |
|---|---|---|---|
| 4,715,063 A | 12/1987 | Haddad et al. | |
| 4,796,287 A | 1/1989 | Reesor et al. | |
| 5,793,863 A * | 8/1998 | Hashimoto | 455/570 |
| 6,292,573 B1 * | 9/2001 | Zurek et al. | 381/386 |
| 6,744,882 B1 * | 6/2004 | Gupta et al. | 379/387.01 |
| 6,766,176 B1 | 7/2004 | Gupta et al. | |
| 6,892,083 B2 | 5/2005 | Shostak | |
| 6,937,868 B2 | 8/2005 | Himmel et al. | |
| 2004/0192243 A1 * | 9/2004 | Siegel | 455/296 |
| 2005/0107129 A1 | 5/2005 | Kaewell et al. | |
| 2005/0282590 A1 * | 12/2005 | Haparnas | 455/570 |

* cited by examiner

*Primary Examiner*—Nick Corsaro
*Assistant Examiner*—Quan M Hua
(74) *Attorney, Agent, or Firm*—BainwoodHuang

(57) ABSTRACT

A technique is directed to controlling speaker volume of a speaker of a portable communications device (e.g., a cellular telephone, a cordless hand phone, a combination of a cellular phone and a hands-free ear piece, etc.). The technique involves receiving an environmental signal from an environmental microphone of the portable communications device. The technique further involves identifying a level of environmental noise based on the environmental signal, and adjusting the speaker volume of the speaker of the portable communications device (e.g., ringer volume, voice output volume, etc.) based on the identified level of environmental noise. Such operation enables a user to accommodate a variety of settings without burdening the user with ongoing manual volume control of the portable communications device.

12 Claims, 5 Drawing Sheets

TECHNIQUES FOR CONTROLLING SPEAKER VOLUME OF A PORTABLE COMMUNICATIONS DEVICE

BACKGROUND

Cellular telephones (or simply cell phones) enable people to communicate in a wireless manner with each other over a variety of distances and within a variety of locales. In particular, cell phones are capable of operation where ever cellular coverage is available.

A conventional cell phone includes, among other things, a voice microphone for receiving audio input from a user, and a speaker for providing audio output to the user. In response to a call, the cell phone typically outputs a ring tone until the cell phone is either (i) answered by the user (e.g., the user opens the cell phone) or (ii) turned off by the user (e.g., the user manually presses a button on the cell phone to shut off the cell phone because the user does not wish to answer the call).

In some settings, a conventional cell phone poses a potential nuisance due to the disruption created by loud speaker output (e.g., a loud ring tone or loud voice output). Accordingly, the operation of conventional cell phones is often prohibited in certain noise-sensitive settings such as public libraries, meeting/presentation areas, and movie theaters to name a few.

For cell phone users to be accommodating in such noise-sensitive locations, cell phone users often turn of their cell phones off completely. As a result, incoming calls do not cause the cell phone to output a ring tone that could potentially interrupt bystanders.

Alternatively, cell phone users can manually set their cell phones to a softer volume setting. As a result, the users may still be able to detect incoming calls and answer them without annoying those in the vicinity.

SUMMARY

Unfortunately, there are deficiencies to the above-described conventional cell phones. For example, when users completely turn off their conventional cell phones to accommodate noise-sensitive locations, the users deprive themselves of the ability to receive incoming calls (e.g., perhaps an emergency call). Additionally, when users manually set their conventional cell phones to a softer volume setting, the users may forget to turn the volume settings back up and thus not hear their cell phones ring once the users return to louder environments (e.g., outdoors, shopping areas, parties, etc.) thus posing the risk of the users missing incoming calls. Furthermore, even if the users are able to successfully detect incoming calls, the audio output may be inappropriate for the particular user location (e.g., the voice output may be too loud thus being offensive to other people, or too soft thus increasing the risk of miscommunication).

In contrast to the above-described conventional cell phones, embodiments of the invention are directed to techniques for controlling speaker volume of a speaker of a portable communications device such as a cellular telephone based on environmental noise. For example, ringer volume is capable of being automatically adjusted in accordance with ambient noise conditions (e.g., the ringer volume can be automatically increased for loud environments, the ringer volume can be automatically decreased for quiet environments). As another example, once calls have been answered, voice output volume is capable of being automatically adjusted in accordance with ambient noise conditions (e.g., voice output volume can be automatically increased for loud environments, voice output volume can be automatically decreased for quiet environments). Such automated operation alleviates the need for users to manually set the volume controls of their cell phones each time the users move to different noise environments.

One embodiment is directed to a method for controlling speaker volume of a speaker of a portable communications device (e.g., a cellular telephone, a cordless hand phone, a combination of a cellular phone and a hands-free ear piece, etc.). The method includes the step of receiving an environmental signal from an environmental microphone of the portable communications device. The method further includes the steps of identifying a level of environmental noise based on the environmental signal, and adjusting the speaker volume of the speaker of the portable communications device (e.g., ringer volume, voice output volume, etc.) based on the identified level of environmental noise. Such operation enables a user to accommodate a variety of settings without burdening the user with ongoing manual volume control of the portable communications device.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention are directed to techniques for controlling speaker volume of a speaker of a portable communications device (e.g., a walkie-talkie, a two-way portable radio, a cellular telephone, a cordless hand phone, a combination of a cellular phone and a hands-free ear piece, etc.) based on environmental noise. For example, ringer volume from the device is capable of being automatically adjusted in accordance with ambient noise conditions (e.g., the ringer volume can be automatically increased for loud environments, the ringer volume can be automatically decreased for quiet environments). As another example, once calls have been answered, voice output volume from the device is capable of being automatically adjusted in accordance with ambient noise conditions (e.g., voice output volume can be automatically increased for loud environments, voice output volume can be automatically decreased for quiet environments). In the context of portable phones, such automated operation alleviates the need for users to manually set the volume controls of their portable phones each time the users move to different noise environments (e.g., from a noise-sensitive environment to a noisy environment and back again).

Figure 1:
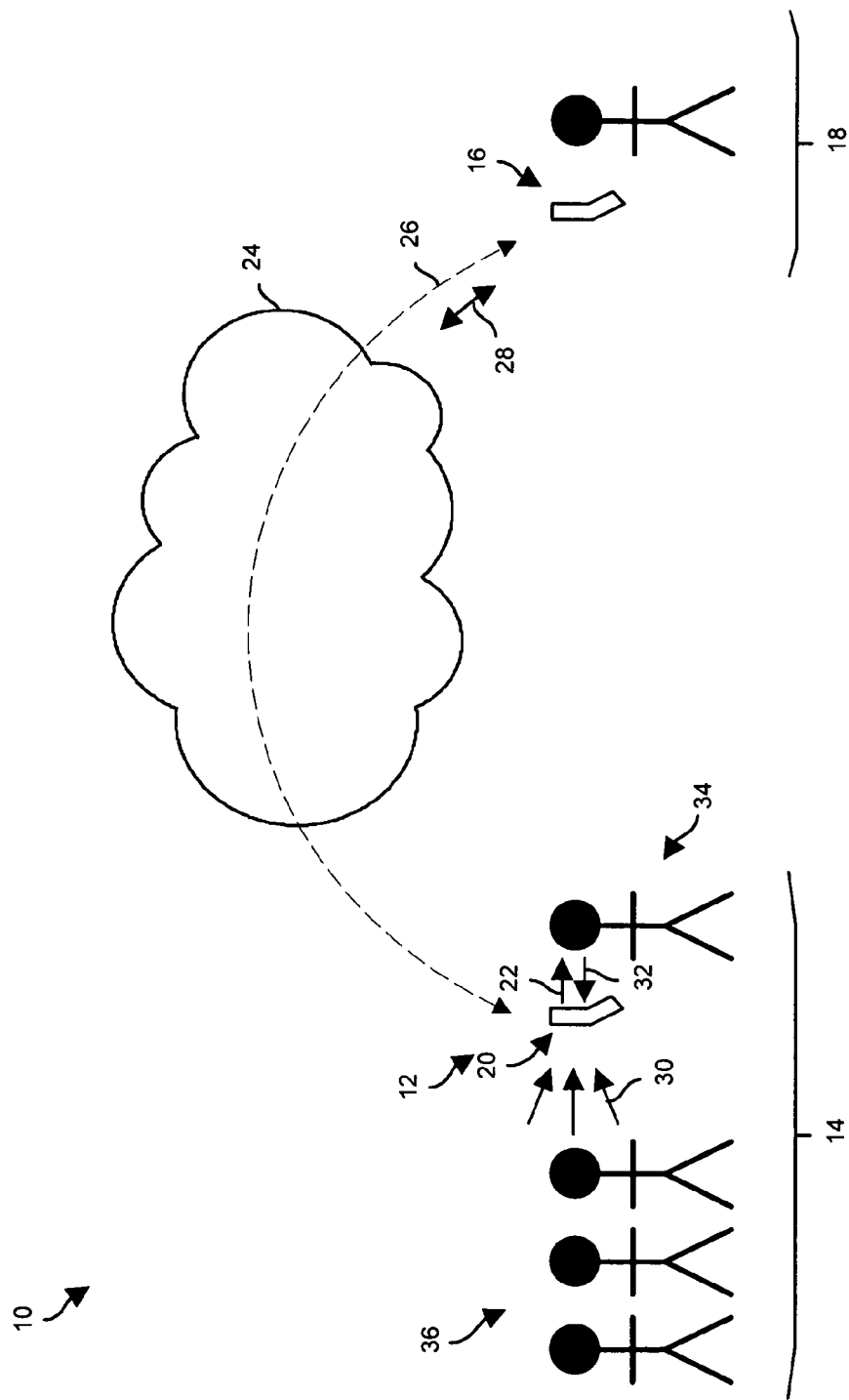
FIG. 1 is a general diagram of a communications system having a portable communications device which is capable of automatically controlling speaker volume of a speaker based on environmental noise.

FIG. 1 is a diagram of a communications system 10 having a portable communications device which is capable of automatically controlling speaker volume of a speaker based on environmental noise. The communications system 10 includes a portable communications device 12 which resides in a first environment 14, and another communications device 16 which resides in a second environment 18. As will be explained in further detail shortly, circuitry 20 within the portable communications device 12 automatically sets the volume of an audio signal 22 based on an identified level of environmental noise (i.e., noise around the device 12).

The devices 12, 16 communicate through a reliable communications medium 24 (shown generally as a cloud 24). That is, the devices 12, 16 exchange signals 26 carrying, among other things, voice data 28 to enable users of the devices 12, 16 to conveniently carry on a conversation. In certain arrangements, the communications medium 24 includes a variety of information transport mechanisms such as cordless telephone technology, cellular telephony technology, other RF media, plain old telephone service (POTS), combinations thereof, etc. As shown in FIG. 1, the portable communications device 12 receives ambient noise 30 and voice input 32, and provides the audio signal 22 (e.g., a ringing sound or ring tone, voice output from the user of the other device 16, etc.).

In certain arrangements, the portable communications device 12 is a personal, remote apparatus that is capable of being carried by a user 34 across a substantially wide range of locations that vary in noise sensitivity. For example, in some arrangements, the portable communications device 12 is a hand-held portion of a cordless phone assembly which can be moved in a portable manner between a loud kitchen and quiet home office of a house. In other arrangements, the portable communications device 12 is a cell phone (perhaps with a hands-free ear attachment) which can be moved from a noisy and crowded commuter environment, to a quiet work/office environment, to a loud shopping mall and so on. Advantageously, the portable communications device 12 automatically adjusts its speaker output to accommodate the noise level of the surroundings (i.e., the existing noise conditions within the environment 14) so as not to disturb other people 36 in the vicinity thus removing the burden of the user 34 having to manually modify speaker volume as the user 34 moves from one noise sensitivity situation to the next.

In some arrangements, the other communications device 16 of the system 10 is configured to similarly output an audio signal based on an identified level of environmental noise (i.e., the other communications device 16 operates in a manner similar to that of the portable communications device 12). In other arrangements, the other communications device 16 is a conventional telephone, e.g., a standard copper-line telephone, a tradition cordless phone, a regular cell phone, etc. Accordingly, the portable communications device 12 is well-suited for exchanging communications with both similar portable communications apparatus as well as legacy apparatus. Further details will now be provided with reference to FIG. 2.

Figure 2:
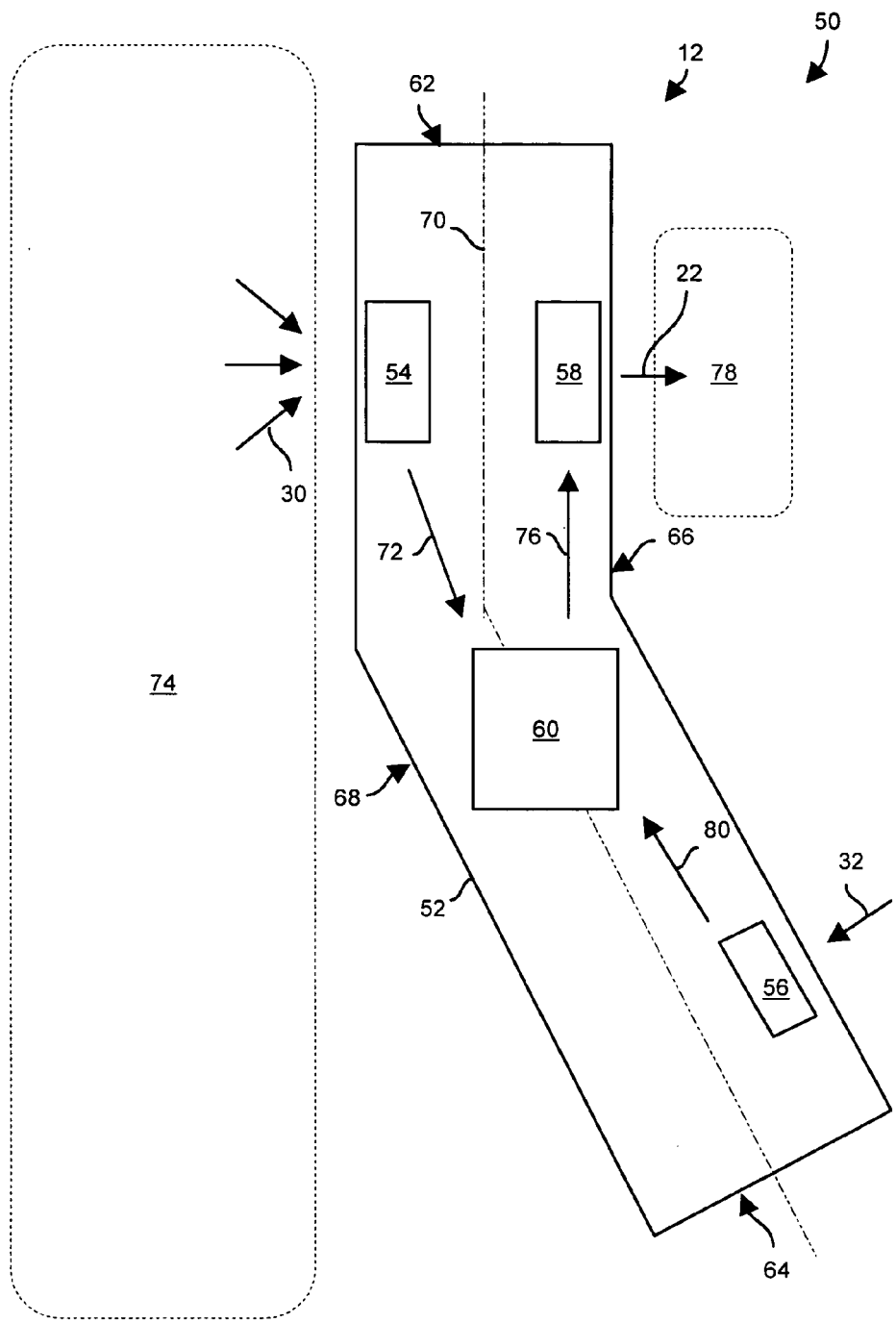
FIG. 2 is a detailed diagram of the portable communications device of FIG. 1.

FIG. 2 is a diagram 50 of the portable communications device 12. The portable communications device 12 includes a housing 52, an environmental microphone 54, a voice microphone 56, a speaker 58, and a controller 60. The housing 52 is configured to provide support, positioning and protection for the environmental microphone 54, the voice microphone 56, the speaker 58, and the controller 60.

In the arrangement shown in FIG. 1, the housing 52 (e.g., a frame or support assembly) defines a first end 62 and a second end 64 which is opposite the first end 62. Additionally, the housing 52 defines a user side 66 and an outer side 68 which is opposite the user side 66 (see the dashed/dotted line 70 in FIG. 2). The environmental microphone 54 and the speaker 58 are disposed adjacent the first end 62 while the voice microphone 56 is disposed adjacent the second end 64. Furthermore, the speaker 58 and the voice microphone 56 are disposed on the user side 66 while the environmental microphone 54 is disposed on the outer side 68.

It should be understood that the voice microphone 56 is configured to take voice input 32 from the user for eventual conveyance to the other device 16. The environmental microphone 54 preferably does not participate in this conveyance of voice input but instead gathers input from the environment for control of the audio output 22 from the device 12. With the environmental microphone 54 being preferably disposed on the side 68 of the housing 52 opposite the voice microphone 56, the environmental microphone 54 is well-positioned to detect sound which is different than the user's voice.

During operation, the controller 60 of the portable communications device 12 is configured to receive an environmental signal 72 from the environmental microphone 54 and, identify a level of environmental noise 30 (also see FIG. 1) based on the environmental signal 72. Accordingly, the environmental signal 72 indicates an amount of ambient noise in a vicinity 74 of the portable communications device 12.

The controller 60 is configured to then provide an output 76 (e.g., a control signal or the adjusted speaker signal itself) which results in an adjusted speaker volume based on the identified level of environmental noise. Accordingly, the speaker 58 is capable of outputting the audio signal 22 with a volume that is appropriate for the current environmental noise level. In the context of ringer volume, the controller 60 is configured to set the ring volume high enough so that the user is able to detect that the device 12 has received an incoming call, but not loud enough to annoy bystanders. In the context of voice output (e.g., from an opening receiving walkie-talkie, after a phone call has been answered, etc.), the controller 60 is configured to set the speaker volume strength high enough for convenient perception by the user's ear when the user's ear is at a location 78 adjacent the speaker 58 but not loud enough to be easily detectable by bystanders in the immediate vicinity. Further details will now be provided with reference to FIG. 3.

Figure 3:
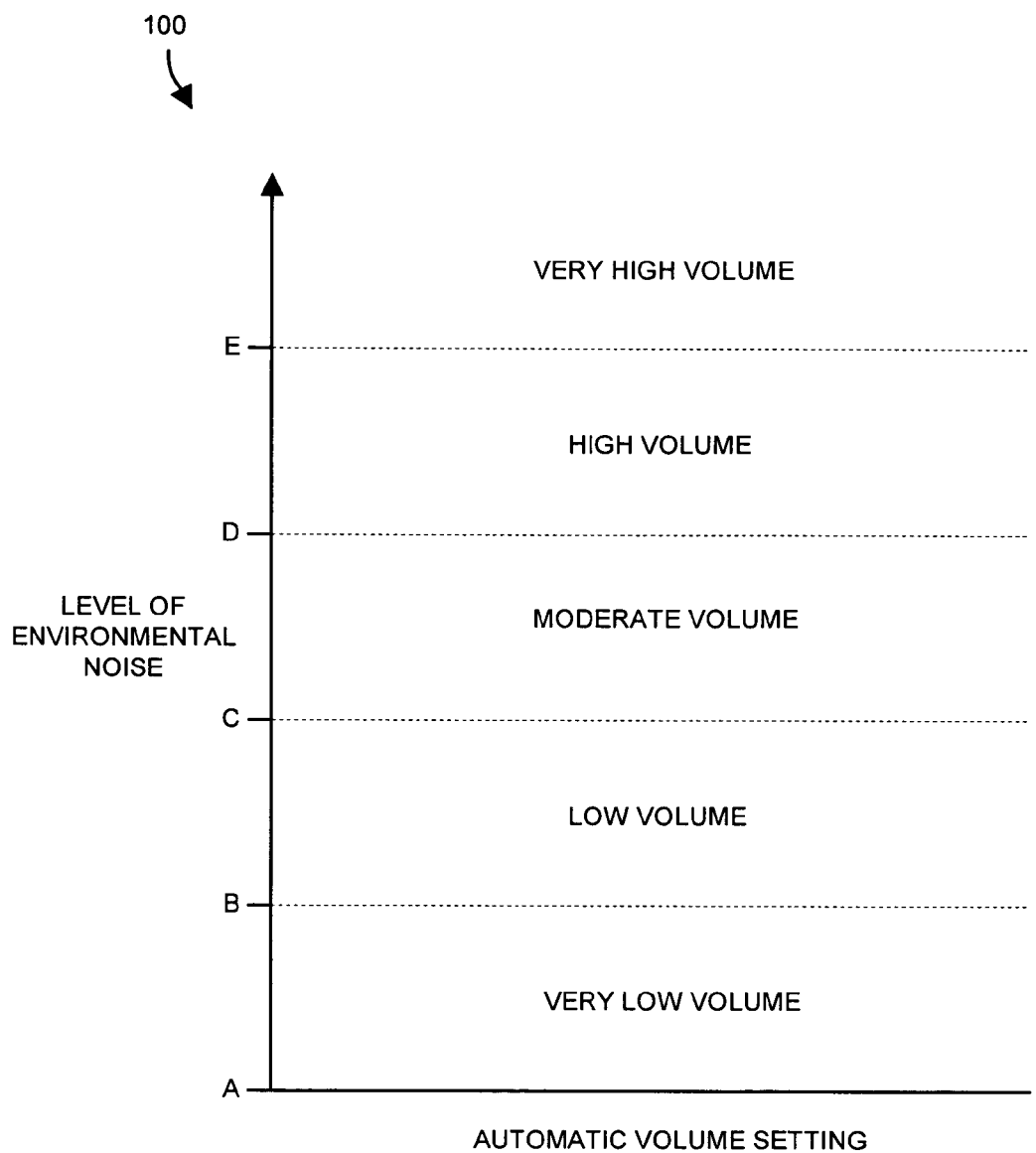
FIG. 3 is a chart illustrating volume control operation of the portable communications device of FIG. 2 in accordance with a first operating mode.

FIG. 3 is a chart 100 illustrating volume control operation of the portable communications device 12 in accordance with a first operating mode. In accordance with this operating mode, the controller 60 (FIG. 2) receives the environmental signal 72 and identifies the level of environmental noise by categorizing the level of environmental noise into one of multiple predefined levels A, B, C, . . . . The number of predefined levels may vary (e.g., two, three, etc.).

By way of example, suppose that the initial environmental noise level is "MODERATE", i.e., the amount of identified noise is initially between thresholds C and D. At this level, the portable communications device 12 is configured to provide the audio signal 22 at a MODERATE volume so that the audio signal 22 can be heard by the user but at a level that is not disruptive to bystanders.

Next, suppose that the environmental noise level drops from "MODERATE" to "LOW", i.e., the amount of identified noise drops below the threshold C and is now between thresholds B and C. At this level, the portable communications device 12 is configured to provide the audio signal 22 at a LOW volume so that the audio signal 22 can be heard by the user but at a level that is still not disruptive to bystanders. That is, the controller 60 is configured to lower the strength of the audio signal 22 when the amount of the ambient noise falls below the threshold C into the LOW volume level.

Similarly, suppose that the environmental noise level changes from "LOW" to "HIGH", i.e., the amount of identified noise increases above the threshold D and is now between thresholds D and E. At this level, the portable communications device 12 is configured to provide the audio signal 22 at a HIGH volume so that the audio signal 22 can still be heard by the user but at a level that is remains comfortable to bystanders. In this situation, the controller 60 is configured to raise the strength of the audio signal 22 when the amount of the ambient noise rises above the threshold D into the HIGH volume level. An alternative to the operation mode illustrated in FIG. 3 will now be provided with reference to FIG. 4.

Figure 4:
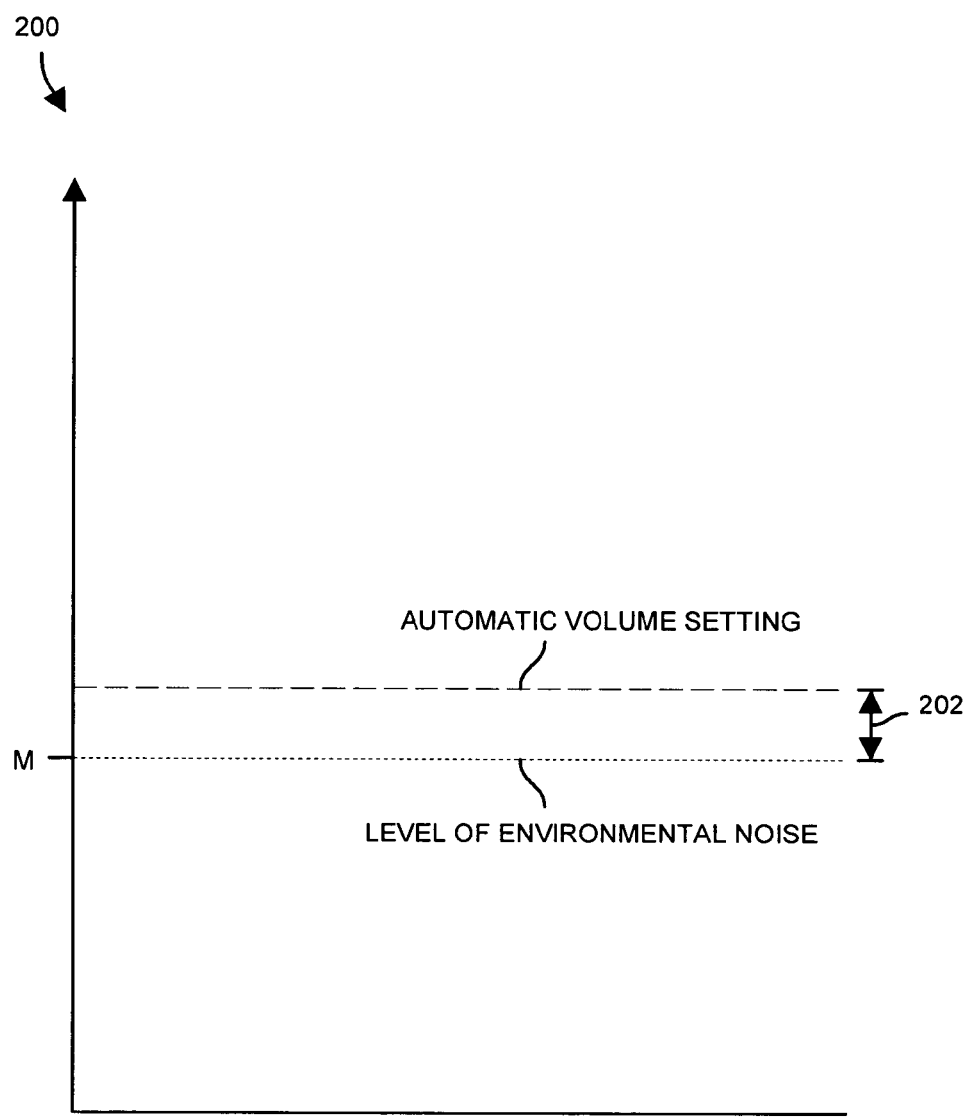
FIG. 4 is a chart illustrating volume control operation of the portable communications device of FIG. 2 in accordance with a second operating mode.

FIG. 4 is a chart 200 illustrating volume control operation of the portable communications device 12 in accordance with a second operating mode. In accordance with this second operating mode, the controller 60 (FIG. 2) receives the environmental signal 72 and identifies the level of environmental noise as a measurement, i.e., measured amount "M". The controller 60 then sets the power of the audio signal 22 to be at a predetermined amount (i.e., an automatic volume setting) relative to the measured amount "M".

In some arrangements, the controller 60 simply sets the strength of the audio signal 22 to be a particular distance 202 from the measured amount "M" thus enabling the strength of the audio signal 22 to remain in locked step with the amount of environmental noise. In other arrangements, the controller 60 is configured to employ a rule-based scheme to provide a non-linear response. In all of these arrangements, the controller 60 reliably controls output of the audio signal 22 so that the user is capable of conveniently hearing the audio signal 22 but also so that the audio signal 22 is not an annoyance to bystanders. Further details will now be provided with reference to FIG. 4.

Figure 5:
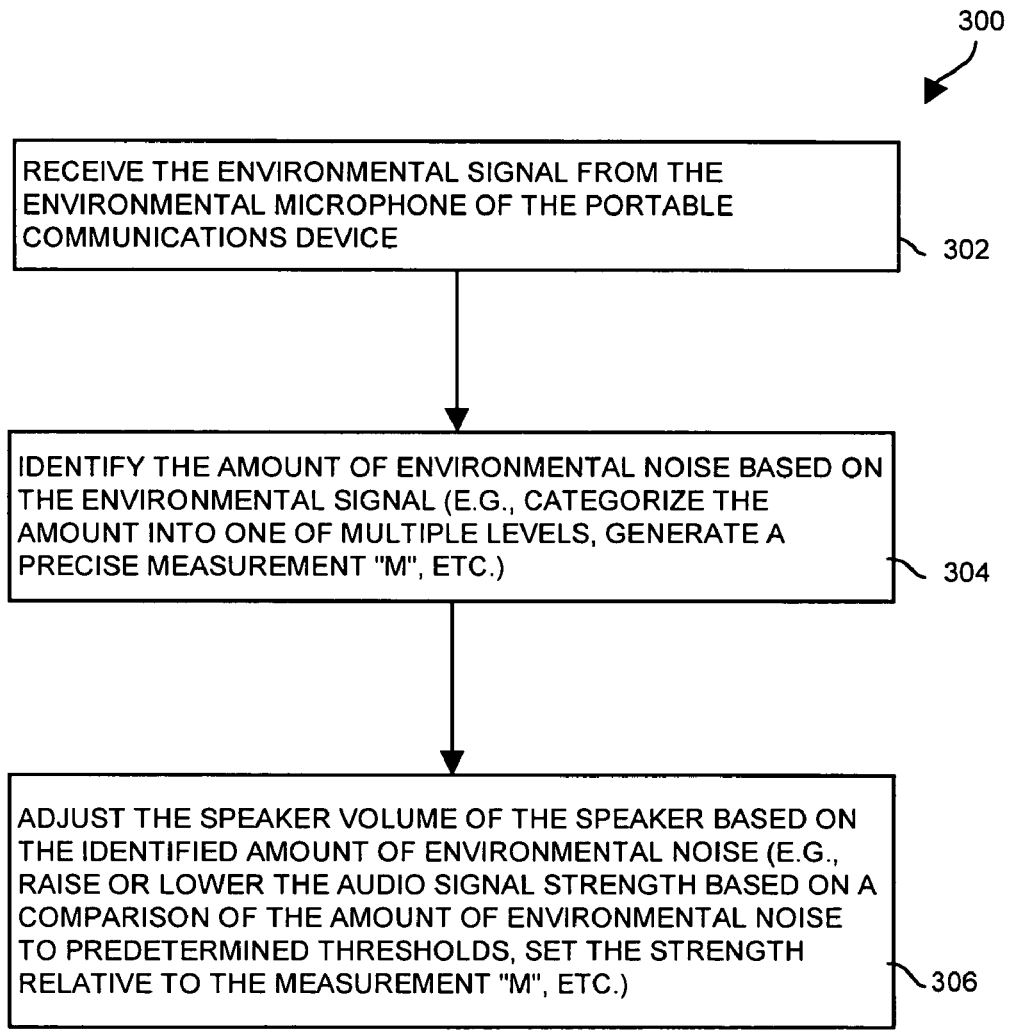
FIG. 5 is a flowchart illustrating operation of the portable communications device of FIG. 1.

FIG. 5 is a flowchart 300 illustrating operation of the controller 60 of the portable communications device 12 when controlling the speaker volume of the speaker 58 (FIG. 2). In step 302, the controller 60 receives the environmental signal 72 from the environmental microphone 54. The environmental signal 72 is indicative of the amount of ambient noise 30 in the vicinity 74 of the device 12.

In step 304, the controller 60 identifies the amount of environmental noise based on the environmental signal 72. In some arrangements, the controller 60 categorizes the amount into one of multiple categories (e.g., see FIG. 3). In other arrangements, the controller 60 generates a precise measurement "M" (e.g., see FIG. 4). Other arrangements are suitable for use as well.

In step 306, the controller 60 adjusts the speaker volume of the speaker 58 based on the identified level of environmental noise. In the arrangements that categorize the level of environmental noise, the controller 60 sets the strength of the audio signal 22 based on this categorization. In the arrangements that generate a measurement "M", the controller 60 sets the strength of the audio signal 22 directly based on the particular measurement "M" (e.g., linearly, non-linearly, and so on). Accordingly, users of the devices 12 do not need to manually change the volume settings of the devices 12. Rather, the user can rely on the devices 12 themselves to automatically adjust their volume outputs based on the levels of environmental noise.

As described above, embodiments of the invention are directed to techniques for controlling speaker volume of a speaker 58 of a portable communications device 12 based on environmental noise. For example, ringer volume from the device 12 is capable of being automatically adjusted in accordance with ambient noise conditions. Similarly, once calls have been answered, voice output volume from the device 12 is capable of being automatically adjusted in accordance with ambient noise conditions. In the context of portable phones, such automated operation alleviates the need for users to manually set the volume controls of their portable phones each time the users move to different noise environments (e.g., from a noise-sensitive environment to a noisy environment and back again).

While this invention has been particularly shown and described with references to preferred embodiments thereof, it will be understood by those skilled in the art that various changes in form and details may be made therein without departing from the spirit and scope of the invention as defined by the appended claims.

For example, the angled geometry of the housing 52 was provided in FIG. 2 by way of example only. Other geometries and configurations are suitable for use as well. For instance, in other arrangements, the housing 52 has a flip-phone configuration, a monolithic flat configuration, a pocket-PC configuration, a multi-part configuration (e.g., a base station and headset), among many others.

As another example, the device 12 was described above as having a speaker 58 (e.g., see FIG. 2). It should be understood that the device 12 is capable of having a set of speakers 58 (e.g., one or more ringer speakers 58 and one or more ear speakers 58. In these various arrangements, the controller 60 is capable of adjusting both ringer volume from the ringer speakers 58 and voice output volume from the ear speakers 58.

Additionally, it should be understood that, in response to a received call, the output of the speaker 58 is not necessarily a ring. To the contrary, the output can be a variety of sounds, bell sounds, chimes, musical rings, sound effects, and the like. In these arrangements, the volume is reliably controlled to prevent the output from posing a nuisance to bystanders.

Furthermore, the communications device 12 was described above as being a portable phone. Nevertheless, the above-described aspects are capable of being applied to old fashion telephones. For instance, the volume of such a phone is capable of being increased in a noisy room (e.g., a conventional family room setting when a loud television is on). Alternatively, the volume is capable of being decreased in a quiet room (e.g., in a bedroom in the middle of the night when people other than the answerer do not wish to be disturbed).

Additionally, it should be understood that the environmental microphone 54 and the voice microphone 56 were described above as being separate microphones. In other arrangements, the environmental microphone 54 and the voice microphone 56 are formed by a single microphone. That is, this single microphone is capable of collecting both environmental noise and a user's voice. When controller 60 controls the ringer volume, the user is not yet speaking into the single microphone so the controller 60 can simply adjust the ringer volume based on the input from the single microphone. However, once the device 12 is engaged in a call and the user is speaking into the single microphone, the controller 60 (i) filters out the user's voice from the total input into the single microphone in order to quantify the amount of environmental noise, and then (ii) controls the volume from the set of speakers 58 based on the amount of environmental noise. Such enhancements and modifications are intended to belong to various embodiments of the invention.

What is claimed is:

1. A method for controlling speaker volume of a speaker of a portable communications device, the method comprising:
continuously receiving an environmental signal from an environmental microphone of the portable communications device;
identifying a level of environmental noise based on the environmental signal; and
adjusting the speaker volume of the speaker of the portable communications device based on the identified level of environmental noise;
wherein the portable communications device is a wireless phone device;
the step of continuously receiving the environmental signal from the environmental microphone of the portable communications device includes obtaining, as the environmental signal from the environmental microphone, an electronic signal indicative of environmental noise in the vicinity of the wireless phone device;
the step of identifying the level of environmental noise based on the environmental signal includes measuring the volume of the environmental noise represented by the environmental signal from the environmental microphone;
wherein the wireless phone device is a cellular telephone having, as the speaker, a cellular telephone speaker to output an audio signal into an ear of a user;
the step of adjusting the speaker volume includes automatically modifying a strength of the audio signal to enable the user to hear the audio signal when the ear of the user is adjacent the cellular telephone speaker;
wherein the cellular telephone further includes a voice microphone which is different than the environmental microphone;
receiving voice input from the user through the voice microphone of the cellular telephone, and conveying the voice input to another communications device which is external to the cellular telephone;
the step of identifying the level of environmental noise includes identifying the level of environmental noise as a measured noise level; and
the step of automatically modifying the strength of the audio signal includes: outputting the audio signal, via the speaker, at a preset value above the measured noise level; and
holding the strength of the audio signal outputted by the speaker to be greater than the measured noise level by the preset value, the strength of the audio signal remaining in locked step above the measured noise level as the volume of the environmental noise changes with time.

2. The method as in claim 1 wherein the cellular telephone speaker is disposed adjacent a first end of the cellular telephone; wherein the voice microphone is disposed adjacent a second end of the cellular telephone, the second end of the cellular telephone being opposite the first end of the cellular telephone; and wherein the environmental microphone is disposed adjacent the first end of the cellular telephone.

3. The method as in claim 1 wherein the environmental microphone is configured to detect sound from a first side of the cellular telephone; and wherein the cellular telephone speaker is configured to direct the audio signal from a second side of the cellular telephone, the first side and the second side being opposite each other.

4. The method as in claim 1 wherein the cellular telephone is configured to ring in response to a received call from another communications device which is external to the cellular telephone; and wherein automatically modifying the volume of the audio signal includes: changing the power of the audio signal outputted by the cellular telephone speaker after the cellular telephone has completed ringing in response to the received call.

5. A portable communications device, comprising:
a housing;
an environmental microphone supported by the housing;
a speaker supported by the housing; and
a controller coupled to the environmental microphone and to the speaker, the controller being configured to:
continuously receive an environmental signal from the environmental microphone, identify a level of environmental noise based on the environmental signal, and adjust a speaker volume of the speaker based on the identified level of environmental noise;
wherein the portable communications device is a wireless phone device;
the controller, when receiving the environmental signal from the environmental microphone of the portable communications device, is configured to obtain, as the environmental signal from the environmental microphone, an electronic signal indicative of environmental noise in the vicinity of the wireless phone device;
the controller, when identifying the level of environmental noise based on the environmental signal, is configured to measure the volume of the environmental noise represented by the environmental signal from the environmental microphone;
the wireless phone device is a cellular telephone having, as the speaker, a cellular telephone speaker constructed and arranged to output an audio signal into an ear of a user;
the controller, when adjusting the speaker volume, is configured to automatically modify a strength of the audio signal to enable the user to hear the audio signal when the ear of the user is adjacent the cellular telephone speaker;
the portable communications device further comprises a voice microphone supported by the housing, the voice microphone being different than the environmental microphone, the controller being configured to (i) receive voice input from the user through the voice microphone and (ii) convey the voice input to another communications device which is external to the cellular telephone;
the controller, when identifying the level of environmental noise is configured to identify the level of environmental noise as a measured noise level; and
the controller, when automatically modifying the strength of the audio signal, is configured to output the audio signal, via the speaker, at a preset value above the measured noise level; and
hold the strength of the audio signal output by the speaker above the measured noise level by the preset value, the strength of the audio signal remaining in locked step above the measured noise level the volume of the environmental noise changes with time.

6. The portable communications device as in claim 5 wherein the cellular telephone speaker is disposed adjacent a first end of the cellular telephone; wherein the voice microphone is disposed adjacent a second end of the cellular telephone, the second end of the cellular telephone being opposite the first end of the cellular telephone; and wherein the environmental microphone is disposed adjacent the first end of the cellular telephone.

7. The portable communications device as in claim 5 wherein the environmental microphone is configured to detect sound from a first side of the cellular telephone; and wherein the cellular telephone speaker is constructed and arranged to direct the audio signal from a second side of the cellular telephone, the first side and the second side being opposite each other.

8. The portable communications device as in claim 5 wherein the cellular telephone is constructed and arranged to ring in response to a received call from another communications device which is external to the cellular telephone; and wherein the controller, when automatically modifying the volume of the audio signal, is constructed and arranged to: change the power of the audio signal outputted by the cellular telephone speaker after the cellular telephone has completed ringing in response to the received call.

9. The method as in claim 1:
wherein the speaker is a ringer speaker constructed and arranged to ring indicating that an incoming phone call is available to commence; wherein adjusting the speaker volume further includes, when the environmental signal indicates that the amount of the ambient noise in the vicinity of the wireless phone device has increased, increasing the speaker volume of the ringer speaker to a level (i) high enough to be audible to the user subject to the increased ambient noise and (ii) low enough to prevent easy audio detection in an immediate vicinity of the user subject to the increased ambient noise;
wherein adjusting the speaker volume further includes, when the environmental signal indicates that the amount of the ambient noise in the vicinity of the wireless phone device has decreased, decreasing the speaker volume of the ringer speaker to a level (i) high enough to be audible to the user subject to the decreased ambient noise and (ii) low enough to prevent easy audio detection in an immediate vicinity of the user subject to the decreased ambient noise.

10. The portable communications device as in claim 5:
wherein the speaker is a ringer speaker constructed and arranged to ring indicating that an incoming phone call is available to commence;
wherein the controller, when adjusting the speaker volume, is further configured to, when the environmental signal indicates that the amount of the ambient noise in the vicinity of the wireless phone device has increased, increase the speaker volume of the ringer speaker to a level (i) high enough to be audible to the user subject to the increased ambient noise and (ii) low enough to prevent easy audio detection in an immediate vicinity of the user subject to the increased ambient noise;
wherein the controller, when adjusting the speaker volume, is further configured to, when the environmental signal indicates that the amount of the ambient noise in the vicinity of the wireless phone device has decreased, decrease the speaker volume of the ringer speaker to a level (i) high enough to be audible to the user subject to the decreased ambient noise and (ii) low enough to prevent easy audio detection in an immediate vicinity of the user subject to the decreased ambient noise.

11. The method as in claim 1 wherein:
adjusting the speaker volume of the speaker includes adjusting the speaker volume independent from the voice input received through the voice microphone;
modifying the strength of the audio signal includes modifying the audio signal independent from the voice input received through the voice microphone; and
conveying the voice input to the other communications device includes conveying the voice input to the other communications device as an unmodified voice signal.

12. The portable communications device as in claim 5 wherein:
the controller, when adjusting the speaker volume, is configured to adjust the speaker volume independent from the voice input received through the voice microphone;
the controller when modifying the strength of the audio signal is configured to modify the audio signal independent from the voice input received through the voice microphone; and
the controller, when conveying the voice input to the other communications device is configured to convey the voice input to the other communications device as an unmodified voice signal.

* * * * *